United States Patent

Jones et al.

Patent Number: 5,872,897
Date of Patent: Feb. 16, 1999

[54] METHOD FOR CONSERVING PRINT MEDIA

[75] Inventors: Christopher Dane Jones, Georgetown; Gary Scott Overall; Phillip Byron Wright, both of Lexington, all of Ky.

[73] Assignee: Lexmark International, Inc., Lexington, Ky.

[21] Appl. No.: 686,874

[22] Filed: Jul. 26, 1996

[51] Int. Cl.⁶ .................................................. G06F 15/00
[52] U.S. Cl. ............................................ 395/109; 395/110
[58] Field of Search ..................................... 395/109, 110, 395/117; 382/258, 259

[56] References Cited

U.S. PATENT DOCUMENTS

| | | | |
|---|---|---|---|
| 5,201,032 | 4/1993 | Kurose | 395/150 |
| 5,309,548 | 5/1994 | Ohta et al. | 395/109 |
| 5,483,625 | 1/1996 | Robertson et al. | 395/117 |
| 5,506,941 | 4/1996 | Kurumida | 395/110 |

FOREIGN PATENT DOCUMENTS 0 694 868 A1   1/1996   European Pat. Off. ....... G06K 15/12

OTHER PUBLICATIONS

Micrografx, Inc., "Micrografx Designer Learning Guide" pp. 2–56–2–69 and 5–21–5–23, 1987–90.

*Primary Examiner*—Edward L. Coles
*Assistant Examiner*—Joseph R. Pokrzywa
*Attorney, Agent, or Firm*—John A. Brady

[57] ABSTRACT

A method of printing an image on a substrate, where a solid border is printed on the substrate, the solid border corresponding to the perimeter of the image. A dead zone, in which no media is applied, is defined adjacent to and interior of the solid border, and a gray pattern is printed adjacent to and interior of the dead zone. A printer according to the present invention is for printing an image on a substrate, and has a data processing means and printer elements. The data processing means has a solid border controller for adjusting the width of a solid border corresponding to the perimeter of the image, and for producing a solid border parameter. Also included in the data processing means is a dead zone controller for adjusting the width of a dead zone adjacent to and interior of the solid border, and for producing a dead zone parameter. The data processing means also includes a gray pattern controller for adjusting the shape and density of a gray pattern printed adjacent to and interior of the dead zone, and for producing a gray pattern parameter. The printer elements are responsive to the data processing means, and receive the solid border parameter, the dead zone parameter, and the gray pattern parameter. The image on the substrate is printed by the printer elements in response to the solid border parameter, the dead zone parameter, and the gray pattern parameter.

7 Claims, 5 Drawing Sheets

METHOD FOR CONSERVING PRINT MEDIA

FIELD OF THE INVENTION

This invention relates to the field of hard copy output. More particularly the invention relates to the field of printing modes which use a reduced amount of print media to form an image on a substrate.

BACKGROUND OF THE INVENTION

One of the many benefits of producing a document by computer is the ability to quickly and easily modify the document, and print out several revisions before deciding on the final version. Also convenient is the ability of a computer or a digital copier to produce multiple copies for distribution to and review by many people.

While interim printed and copied drafts of a document are useful, production of such may dramatically increase the overall cost of the final document, as each copy of the document produced requires additional consumable materials, such as print media and paper. The cost of each copy of a document produced can be reduced by reducing the consumables used.

One method of reducing the cost of the print media required by a printer or a digital copier is to use less of it for each copy of the document produced. For an ink jet printer, this may mean using less ink to form the images on the paper, and for a laser printer or digital copier it may mean using less toner to form the images.

The amount of media that is used to form an image may be reduced by adjusting the method by which the image is formed. For example, in portions of the image where a solid, unbroken field of media would typically be applied, an intermittent pattern of media and unprinted areas could be used. Various methods for reducing the print media are available. One such technology may be termed graying, and may be used not only to conserve media, but to approximate gray areas on a printed page.

Different graying methods have been used to reduce the amount of media required to print an image. For example, all of the portions of an image which would usually be solidly covered by media could have a gray pattern applied to them. Thus, those portions that would have otherwise been solidly covered with media, now only require a fraction of that amount of media. The amount of media saved depends on the density of the gray pattern used, or in other words, the ratio of printed and unprinted areas in the gray pattern. Another method would be to apply the gray pattern to only some portions of the image, and solid media to other portions. This latter method can be especially useful for images such as letters and other alphanumeric characters.

Letters which are printed by forming a solid border of media at the outside edge of the character, and then filled in with a gray pattern of media, may be easier to read than those characters which are completely formed of a gray pattern of media. Legibility of the font at different sizes tends to be affected by the width of the solid border, and the density of the gray pattern. However, these parameters are typically not adjustable in current technology devices.

Further, as image size decreases, the solid border of an image comprises a greater portion of the image, and there is less space inside the image for a gray pattern. For such images an interior gray pattern does not offer much of a savings in print media.

SUMMARY OF THE INVENTION

In accordance with the present invention, it is not necessary to extend the gray pattern at the interior of the image all the way to the solid border. Current technology does not allow for this degree of control over image density parameters, even though the ability to do so would allow a user to precisely control not only the aesthetics of the printed image, but also the ability to balance the aesthetics of the image with the amount of media consumed in printing the image.

The method and apparatus of the present invention allows the user greater control over the media saving features of a printer or digital copier, such as by controlling the thickness of the solid border of the image, the density of the gray pattern used at the interior of the image, and the proximity of the gray pattern to the solid border.

In the method of printing an image on a substrate, a solid border is printed on the substrate, the solid border corresponding to the perimeter of the image. A dead zone, in which no media is applied, is defined adjacent to and interior of the solid border, and a gray pattern is printed adjacent to and interior of the dead zone.

A printer according to the present invention is for printing an image on a substrate, and has a data processing means and printer elements. The data processing means has a solid border controller for adjusting the width of a solid border corresponding to the perimeter of the image, and for producing a solid border parameter. Also included in the data processing means is a dead zone controller for adjusting the width of a dead zone adjacent to and interior of the solid border, and for producing a dead zone parameter. The data processing means also includes a gray pattern controller for adjusting the shape and density of a gray pattern printed adjacent to and interior of the dead zone, and for producing a gray pattern parameter.

The printer elements are responsive to the data processing means, and receive the solid border parameter, the dead zone parameter, and the gray pattern parameter. The image on the substrate is printed by the printer elements in response to the solid border parameter, the dead zone parameter, and the gray pattern parameter.

In preferred embodiments the printer may be one or more of an ink jet printer, a laser printer, or a digital copier. Further, the printer may have means for providing user supplied parameters to the solid border controller, the dead zone controller, and the gray pattern controller. An automated image controller can automatically provide values for the otherwise user supplied parameters, based on either the characteristics of the image to be printed, or on a simple control on the user interface.

BRIEF DESCRIPTION OF THE DRAWINGS

Further advantages of the invention will become apparent by reference to the detailed description of preferred embodiments when considered in conjunction with the following drawings, in which like reference numerals denote like elements throughout the several views, and wherein.

DETAILED DESCRIPTION OF THE INVENTION

Figure 1A:
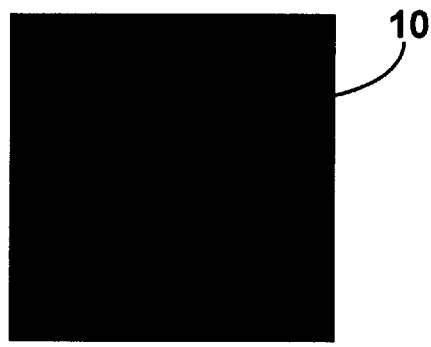
FIG. 1A is an image printed with a solid, unbroken field of print media.

Referring now to the figures, there is depicted in FIG. 1A a printed image 10. Image 10 is created by covering the substrate with an unbroken field of solid print media. Thus image 10 is completely defined, with those portions of the substrate which are covered by media comprising the image 10, with only the portions of the substrate surrounding image 10 being not covered by media.

Figure 1B:
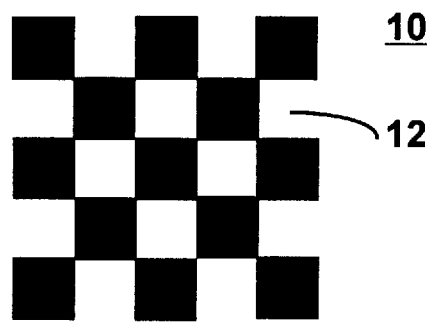
FIG. 1B is an image printed with a gray pattern.

FIG. 1B also depicts an image 10 that, instead of being defined by an unbroken field of solid media, is defined by a gray pattern 12. The gray pattern 12 is characterized by portions of the image 10 being covered with print media, and other portions of the image 10 being left unprinted. In the example depicted, the unprinted areas of the image 10 are approximately the same in size and number as the printed areas, and so about half as much print media has been used in printing the image 10 of FIG. 1B as was used in printing the image 10 of FIG. 1A.

In printing technology it is convenient to refer to print elements, or pels, which are the smallest printed features a printer can produce on a substrate when the printer is operating in a standard configuration. Consumer oriented printers, for example, currently operate at a resolution of from about 300 to about 600 pels, or dots, per inch.

The gray pattern 12 may be formed by various methods. For example, in the case of a laser printer, the unprinted portions of the gray pattern 12 can be formed by turning off the laser when it passes over some of the pels corresponding to the image 10. The process of printing some of the pels and not printing others of the pels is generally termed "dithering." Thus the gray pattern 12 is formed in this manner by printing a field where some of the pels are printed, and others are left unprinted.

Alternately, the printer may be operated such that all of the pels are printed, but the way in which the pels are printed is adjusted so that an unprinted portion is left between consecutive pels. This is generally termed "modulation." In other words, when operated normally, there is typically no unprinted portion between two consecutive pels, but when a printer utilizes modulation, an unprinted portion is left between two consecutive pels. There are several ways in which this can be accomplished.

For example, the duty cycle of the laser, or in other words the normal length of time that the laser is energized to form a pel, may be reduced. Thus, if a duty cycle of sixty percent is typically required to produce a fully formed pel, then reducing the duty cycle to twenty percent will produce a pel that has a printed portion and an unprinted portion within the pel itself.

Figure 5:
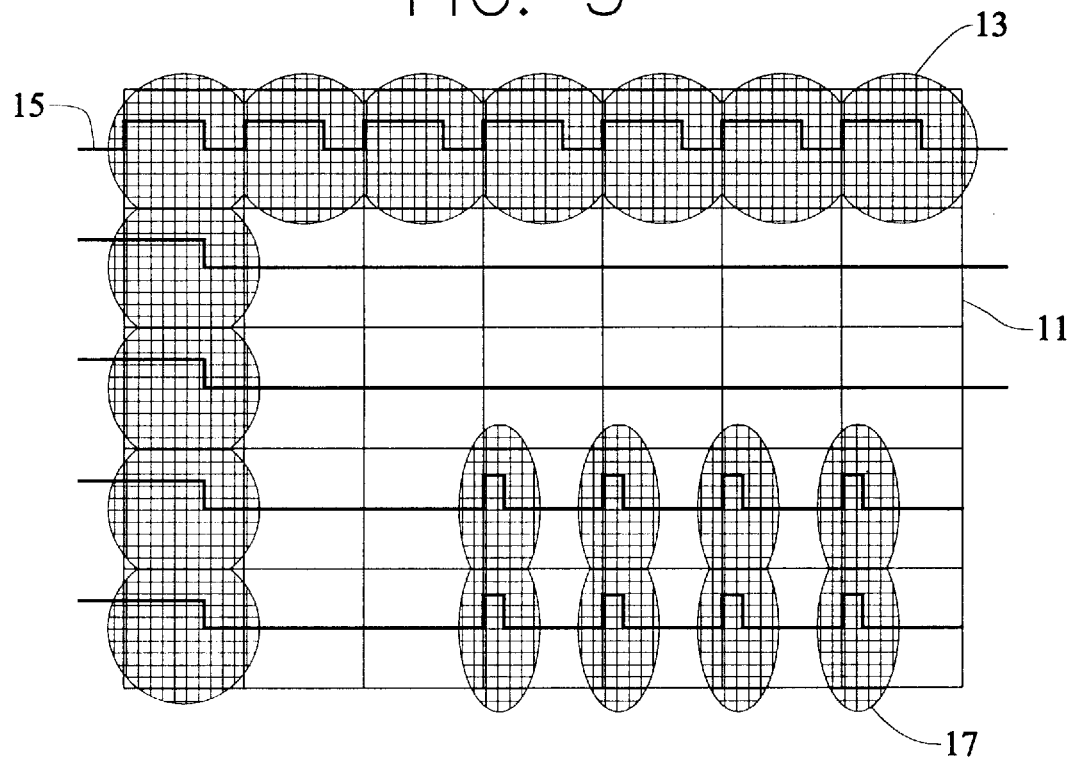
FIG. 5 is a graphical representation of graying by a first method of modulation.

This type of modulation is graphically illustrated in FIG. 5, which depicts a matrix of pel boundaries 11, within which are printed full size pels 13, and modulated pels 17. It will be appreciated that the pel boundaries 11 are not typically printed on a substrate, but are depicted here merely to represent the area which a full size pel would normally cover. Line 15 represents the length of time during which the laser is energized. Thus for full size pel 13 in the upper left hand corner of the matrix, the laser is on for approximately sixty percent of the time, and then is dropped to a lower state for about forty percent of the time. The laser is again pulsed high to form the next pel. This represents a sixty percent duty cycle.

The modulated pels 17 are formed by pulsing the laser for a reduced period of time, or in other words, by using a reduced duty cycle. As depicted in FIG. 5, a duty cycle of approximately twenty percent is depicted. In this manner, an unprinted portion is left between the printed portions of the modulated pels 17, and a gray pattern has been created.

For further example, the power of the laser can be reduced when forming the pels in the gray pattern 12, so that the pels are formed with a printed portion that is smaller than normal, leaving an unprinted portion between them.

Figure 6:
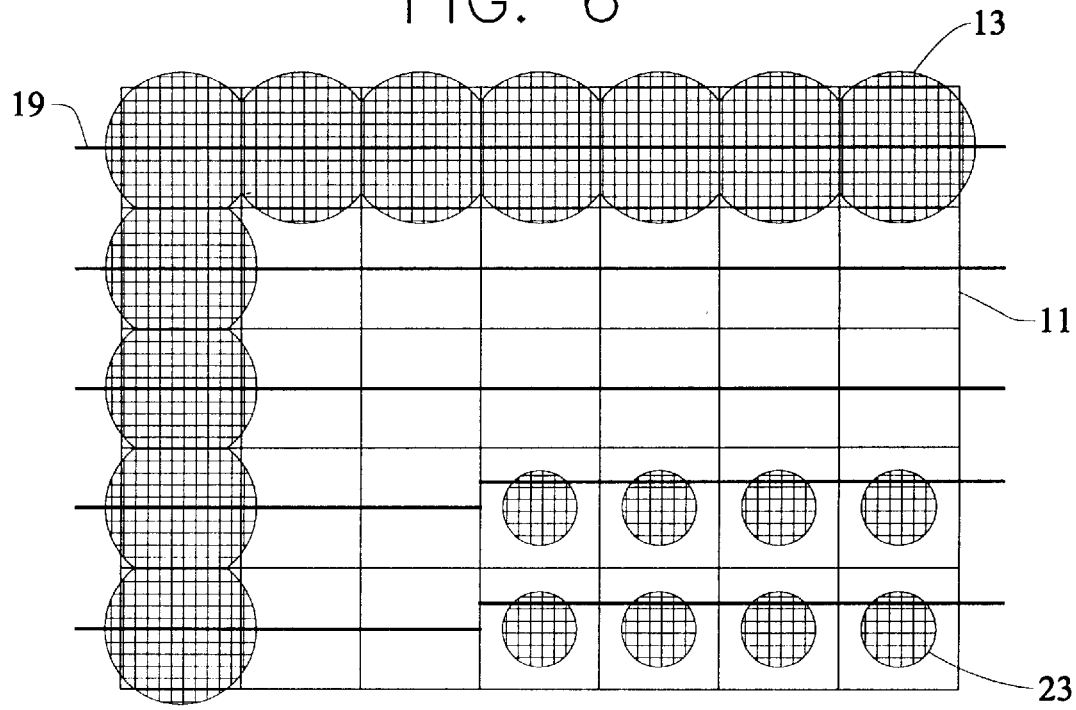
FIG. 6 is a graphical representation of graying by a second method of modulation.

This type of modulation is graphically depicted in FIG. 6. Line 19 represents a printer parameter such as laser power. The full size pels 13 are formed using a normal power level. The modulated pels 23 are formed by using an alternate power level, such as a reduced power level. In this manner, an unprinted portion is left around a printed portion of each of the pels 23 printed, and a gray pattern 12 is created.

Thus, as described in the examples above, the gray pattern 12 may be formed either by arrangements of fully formed pels interspersed with unprinted pels (dithering), or fields of pels that are not fully formed and so leave unprinted portions within themselves (modulation). These same methods of forming the gray pattern 12, and other similar methods, also have general application in the example of a digital copier as a printer.

When an ink jet device is the printer, the amount of ink deposited on the substrate can be reduced using a dithering technique, such as by turning the heater element of the print head off and on over alternating portions of the image. An ink jet printer can also be modulated, such as by reducing the current sent to a heater element, thus reducing the amount of ink ejected from the nozzle and producing pels that are not fully formed. Thus, an ink jet printer may also form the gray pattern 12 by either dithering or modulation. As can be seen, there are many methods of producing the printed and unprinted portions of the gray pattern 12, all of which are equally applicable to the method and apparatus described herein.

Figure 1C:
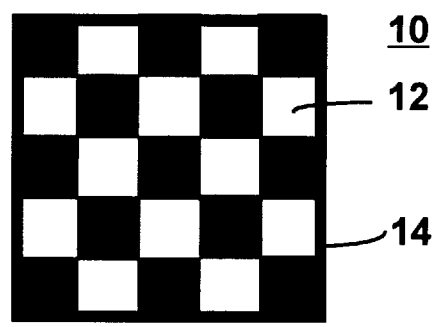
FIG. 1C is an image printer with a gray pattern and a solid border.

FIG. 1C depicts an image 10 that has been formed by printing a solid border 14 of media on the substrate, corresponding to the perimeter of the image 10. Interior of the solid border 14 is a gray pattern 12. By comparing FIG. 1B and FIG. 1C it is seen that FIG. 1C more clearly defines the image 10 than does FIG. 1B. In FIG. 1B it is somewhat unclear whether the unprinted areas of the gray pattern 12 which are near the perimeter of the image 10 are intended to be a portion of the image 10. However, because the image 10 of FIG. 1C has the solid border 14, the perimeter of the image 10 is clearly defined, and there is no ambiguity.

Figure 2A:
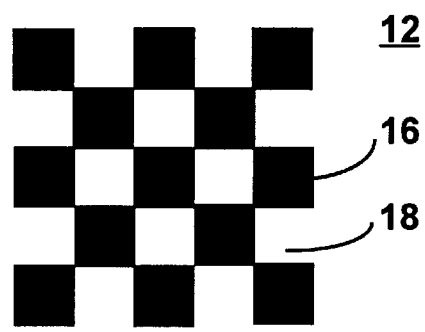
FIG. 2A is a gray pattern having a first pattern and a first density.

FIG. 2A depicts a gray pattern 12, having a first pattern and a first density. The pattern of the printed areas 16 is generally square and is formed according to any of the methods described above. That is to say, the length of each printed area 16 is the same as the height of each printed area 16. As the number and size of printed areas 16 is roughly equal to the number and size of gaps 18, the density of the gray pattern 12 of FIG. 2A is about fifty percent.

Figure 2B:
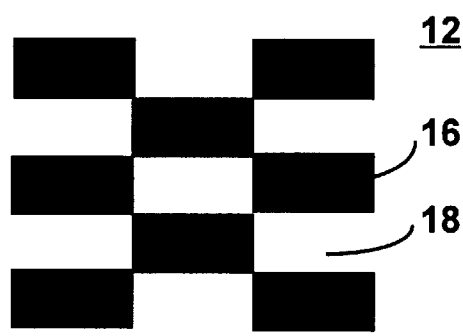
FIG. 2B is a gray pattern having a second pattern and a first density.

FIG. 2B depicts a gray pattern 12 having a second pattern and a first density. As the number and size of the printed areas 16 and gaps 18 is again roughly the same, the density is again about fifty percent. However, the printed areas 16 are each generally rectangular in shape instead of square as depicted in FIG. 2A. That is to say, the length of each printed area 16 is approximately twice the height of each printed area 16. Thus the density of the gray pattern 12 as depicted in FIG. 2B is generally the same as the density of the gray pattern 12 depicted in FIG. 2A, but the pattern of the two gray patterns 12 are not the same. Therefore, it is seen that density and pattern of a gray pattern 12 may be varied independently.

Figure 2C:
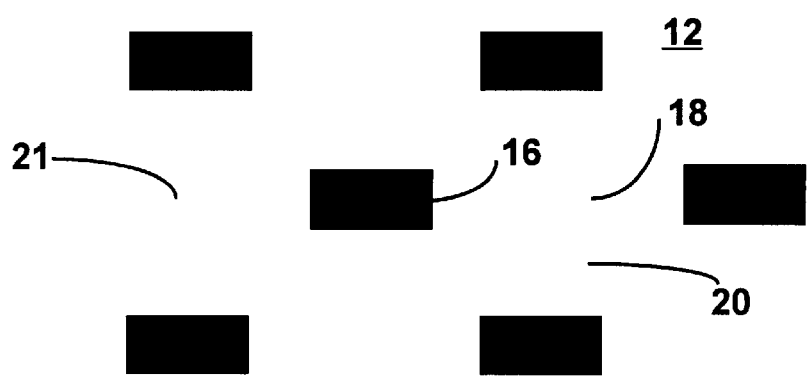
FIG. 2C is a gray pattern having a second pattern and a second density.

FIG. 2C completes the concept introduced above by depicting a gray pattern 12 which has a second pattern and a second density. The printed areas 16 are visually the same shape as those depicted in FIG. 2B. However, the gaps 18 are not the same length as the printed areas 16. In addition, there is a skip 20 left between the rows of printed areas 16 and gaps 18, which skip 20 is unprinted. There is an offset 21 which is the distance by which the printed areas 16 are offset one from another in adjacent rows. The offset 21 may or may not be the same length as a gap 18. Thus, the gray pattern 12 of FIG. 2C depicts one method by which the density of the gray pattern 12 can be reduced.

Figure 3A:
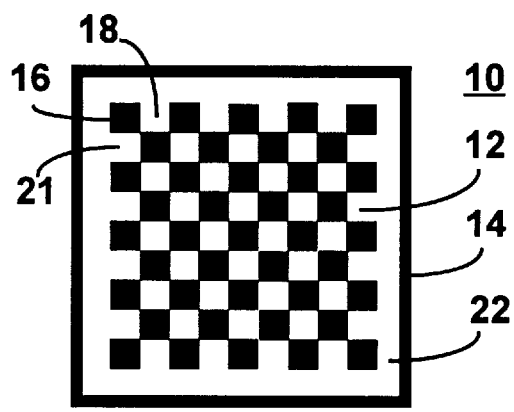
FIG. 3A is an image printed with a gray pattern, a solid border, and a dead zone.
Figure 3B:
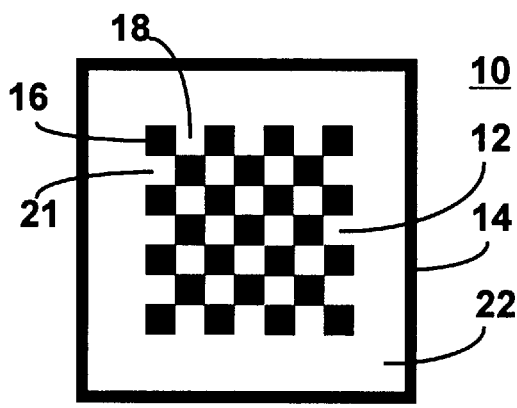
FIG. 3B is an image printed with a gray pattern, a solid border, and an enlarged dead zone.

An image 10 is depicted in FIG. 3A, which has a solid border 14, a gray pattern 12, and a dead zone 22 adjacent to and interior of the solid border 14. The dead zone 22 is preferably an unprinted area of the image 10, and is disposed between the solid border 14 and the gray pattern 12. In an alternate embodiment, the dead zone 22 is also formed by graying, where the graying in the dead zone 22 has a much lower density than the gray pattern 12. By enlarging the width of the dead zone 22, such as depicted in FIG. 3B, the size of the gray pattern 12 required to fill the image 10 is reduced. Thus, by enlarging the width of the dead zone 22, less print media is required to form the image 10. However, because the solid border 14 remains in place, the image 10 is still completely defined.

Similarly, the width of the dead zone 22 can be reduced, thus requiring the gray pattern 12 to cover a larger region, and increasing the amount of print media required to form the image 10.

Figure 3C:
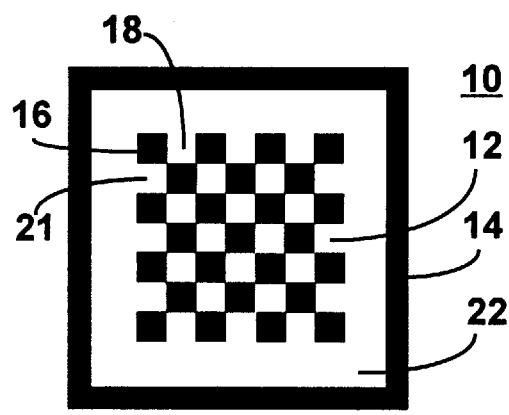
FIG. 3C is an image printed with a gray pattern, an enlarged solid border, and an enlarged dead zone.

As depicted in FIG. 3C, the solid border 14 of the image 10 may also vary in width, and is enlarged as shown here. Enlarging the width of the solid border 14 generally tends to increase the amount of print media required to form the image 10. Similarly, the width of the solid border 14 can be reduced, which would generally require a reduced amount of print media to form the image 10.

As can be seen, the width of the dead zone 22 is related to the position at which the left-most printed area 16 in the top row of the gray pattern 12 starts. The offset 21, or position at which the second row of printed areas 16 commences, is in this example the same as the length of the gaps 18. However, it will be appreciated that this depiction is for example only, and that all of the variations described above are equally applicable for implementation.

Further, while each of FIGS. 3A, 3B, and 3C have been depicted with the same gray pattern 12, it will be appreciated that gray patterns 12 having different patterns and densities may be used as well. Thus, it is possible to independently vary each one of gray pattern 12 pattern, gray pattern 12 density, solid border 14 width, and dead zone 22 width, each of which has an effect on the amount of print media required to form the image 10, and each of which will affect the aesthetics of the image 10.

Figure 4A:
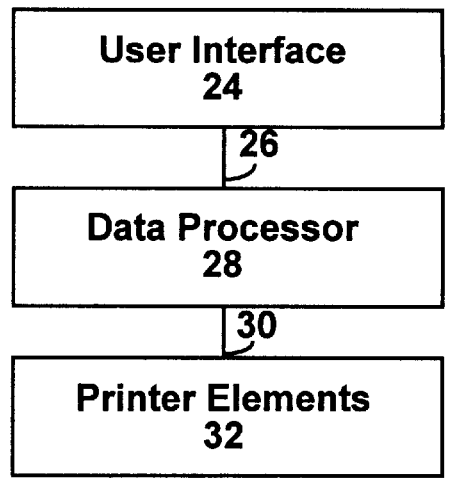
FIG. 4A is a functional block diagram of a printer according to the present invention.

In FIG. 4A there is depicted a functional block diagram for one embodiment of a printer implementing a method of the present invention. A user interface 24 receives input from a user, and passes the input, in either a raw or modified form, via line 26 to a data processor 28. The data processor 28 acts upon the input received from the user interface 24, and produces control parameters which are passed via line 30 to the printer elements 32. The printer elements 32 produce the image on the substrate.

Figure 4B:
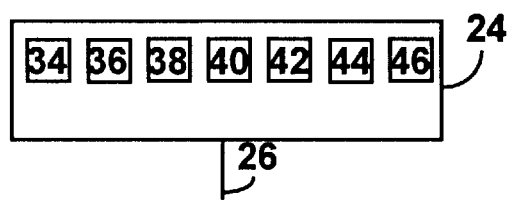
FIG. 4B is a functional block diagram of a preferred embodiment of a user interface of a printer according to the present invention.

FIG. 4B depicts another embodiment of the user interface 24. In this embodiment, the user interface 24 is adapted to receive input comprising a gray pattern start parameter 34, a gray pattern length parameter 36, a gray pattern gap parameter 38, a gray pattern height parameter 40, a gray pattern skip parameter 42, a gray pattern offset parameter 44, and a modulation parameter 46.

The gray pattern start parameter 34 defines where the left-most printed area 16 in the top row of the gray pattern 12 starts printing. Thus, the gray pattern start parameter 34 also defines the total width that will be allotted to the solid border 14 and the dead zone 22. The portions of this total width that will be allotted to the solid border 14 and the dead zone 22 is defined by the modulation parameter 46.

The gray pattern length parameter 36 defines the length of each printed area 16 in the gray pattern 12, and the gray pattern height parameter 40 defines the height of each printed area 16 in the gray pattern 12. The gray pattern gap parameter 38 and the gray pattern skip parameter 42 define the length of the gaps 18 and the height of the skips 20, respectively, in the gray pattern 12. Finally, the gray pattern offset parameter 44 defines the width of the offset 21 of the gray pattern 12.

Figure 4C:
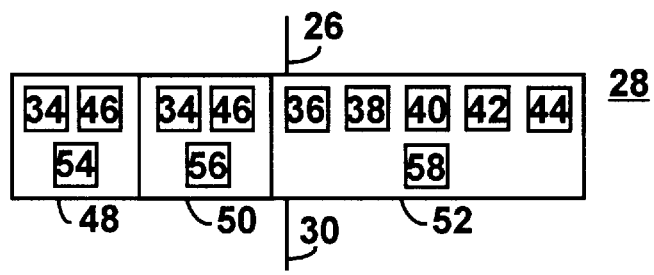
FIG. 4C is a functional block diagram of a preferred embodiment of a data processor of a printer according to the present invention.

All of these parameters may be received, in one form or another, from the user via the user interface 24. FIG. 4C depicts a preferred embodiment of the data processor 28, which receives all of the parameters described above via line 26. Within data processor 28 there is a solid border controller 48, a dead zone controller 50, and a gray controller 52.

The solid border controller 48 receives the gray pattern start parameter 34 and the modulation parameter 46. By knowing where the gray pattern 12 starts, as indicated by the gray pattern start parameter 34, the solid border controller 48 knows how much total space is allotted to the combined widths of the solid border 14 and the dead zone 22. Then, by means of the modulation parameter 46, the solid border controller 48 knows how much of that total space is to be allotted to the solid border 14. When this has been calculated, the solid border controller 48 produces a solid border parameter 54, which is passed to the printer elements 32 via the line 30.

The dead zone controller 50 receives the gray pattern start parameter 34 and the modulation parameter 46. By knowing where the gray pattern 12 starts, as indicated by the gray pattern start parameter 34, the dead zone controller 50 knows how much total space is allotted to the combined widths of the solid border 14 and the dead zone 22. Then, by means of the modulation parameter 46, the dead zone controller 50 knows how much of that total space is to be allotted to the dead zone 22. When this has been calculated, the dead zone controller 50 produces a dead zone parameter 56, which is passed to the printer elements 32 via the line 30.

The gray controller 52 receives the gray pattern length parameter 36, the gray pattern gap parameter 38, the gray pattern height parameter 40, the gray pattern skip parameter 42, and the gray pattern offset parameter 44. The gray controller 52 uses the gray pattern length parameter 36 and the gray pattern height parameter 40 to define the length and height, respectively, of the printed areas 16 of the gray pattern 12. The gray pattern gap parameter 38 is used by the gray controller 52 to define the length of the gaps 18 of the gray pattern 12. The height of the skips 20 of the gray pattern 12 is defined by the gray controller 52 by using the gray pattern skip parameter 42. And similarly, the offset 21 of the gray pattern 12 is defined by the gray controller 52 by using the gray pattern offset parameter 44. Using these defined values, the gray controller 52 produces a gray pattern parameter 58, which is passed to the printer elements 32 via line 30.

The printer elements 32 receive the solid border parameter 54, the dead zone parameter 56, and the gray pattern parameter 58, and use these parameters to construct the image 10 on the substrate. The solid border 14, corresponding to the perimeter of the image 10, is printed on the substrate in response to the solid border parameter 54. The gray pattern 12 is printed on the substrate interior of the solid border 14 in response to the gray pattern parameter 58, and is disposed at a distance from the solid border 14 corresponding to the width of the dead zone 22 in response to the dead zone parameter 56.

Figure 4D:
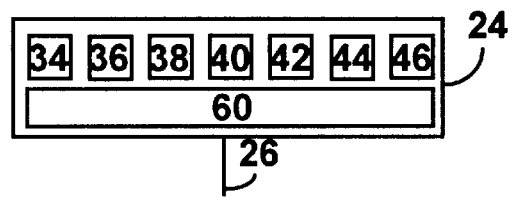
FIG. 4D is a functional block diagram of an especially preferred embodiment of a user interface of a printer according to the present invention.

In an especially preferred embodiment of the user interface 24, there is an automated image controller 60 within the user interface 24, as depicted in FIG. 4D. The automated image controller 60 can automatically provide values for the gray pattern start parameter 34, the gray pattern length parameter 36, the gray pattern gap parameter 38, the gray pattern height parameter 40, the gray pattern skip parameter 42, the gray pattern offset parameter 44, and the modulation parameter 46, based on the characteristics of the image 10 to be printed. Thus, when the automated image controller 60 is activated, the user is not required to make any input via the user interface 24, and the automated image controller 60 produces the input required by the data processor 28 to control how the image 10 is printed by the printer elements 32.

In an alternate embodiment the solid border parameter 54, dead zone parameter 56, and gray pattern parameter 58 are all entered directly by the user via the user interface 24.

While the word "gray" is used throughout this description of the invention, it will be appreciated that the invention is equally applicable to color printing. As it applies to color printing, gray means the removal of the primary color, or in other words the addition of white, in a printed area (assuming printing on a white substrate). Thus, for a fully red area to be "grayed," as used herein, the area would be printed in pink, such as would occur when small red patches are interspersed with small white (unprinted) patches, and are interpreted by the eye as being pink.

Thus a method and apparatus are described which can produce alpha-numeric, bit map, or other images 10 while conserving print media. While specific embodiments of the invention have been described with particularity above, it will be appreciated that those skilled in the art may suggest numerous rearrangements, modifications and substitutions of the invention without departing from the spirit of the invention.

What is claimed is:

1. A printer for printing an image on a substrate comprising:
   a user interface for receiving from a user;
      a gray pattern start parameter,
      a gray pattern length parameter,
      a gray pattern gap parameter,
      a gray pattern height parameter,
      a gray pattern skip parameter,
      a gray pattern offset parameter, and
      a modulation parameter;
   data processing means having;
      a solid border controller for receiving the gray pattern start parameter and the modulation parameter, computing the width of a solid border based on the gray pattern start parameter and the modulation parameter, and producing a solid border parameter,
      a dead zone controller for receiving the gray pattern start parameter and the modulation parameter, computing the width of a dead zone based on the gray pattern start parameter and the modulation parameter, and producing a dead zone parameter, and
      a gray controller for receiving the gray pattern length parameter, the gray pattern gap parameter, the gray pattern height parameter, the gray pattern skip parameter, and the gray pattern offset parameter, computing a gray pattern based on the gray pattern length parameter, the gray pattern gap parameter, the gray pattern height parameter, the gray pattern skip parameter, and the gray pattern offset parameter, and producing a gray pattern parameter, and
   printer elements responsive to the data processing means for;
      receiving the solid border parameter, the dead zone parameter, and the gray pattern parameter,
      printing the solid border on the substrate corresponding to the perimeter of the image in response to the solid border parameter, and
      printing the gray pattern interior of the solid border in response to the gray pattern parameter, disposed at a distance from the solid border corresponding to the width of the dead zone in response to the dead zone parameter.

2. The printer of claim 1 wherein the printer further comprises an ink jet printer.

3. The printer of claim 1 wherein the printer further comprises a laser printer.

4. The printer of claim 1 wherein the printer further comprises a digital copier.

5. The printer of claim 1 further comprising an automated image controller for automatically providing values for the gray pattern start parameter, the gray pattern length parameter, the gray pattern gap parameter, the gray pattern height parameter, the gray pattern skip parameter, the gray pattern offset parameter, and the modulation parameter, based on the characteristics of the image to be printed.

6. The printer of claim 1 wherein the image further comprises an alphanumeric character.

7. The printer of claim 1 wherein the image further comprises a bit map character.

* * * * *